(12) United States Patent
Jonsson et al.

(10) Patent No.: US 10,037,454 B2
(45) Date of Patent: *Jul. 31, 2018

(54) METHOD AND DEVICE FOR FORMING A FINGERPRINT REPRESENTATION

(71) Applicant: Fingerprint Cards AB, Göteborg (SE)

(72) Inventors: Kenneth Jonsson, Kungälv (SE); David Tingdahl, Mölndal (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,496

(22) Filed: Aug. 29, 2017

(65) Prior Publication Data

US 2018/0173920 A1   Jun. 21, 2018

(30) Foreign Application Priority Data

Dec. 19, 2016  (SE) ...................................... 1651675

(51) Int. Cl.
 *G06K 9/00* (2006.01)
 *G06F 21/32* (2013.01)

(52) U.S. Cl.
 CPC ........... *G06K 9/0002* (2013.01); *G06F 21/32* (2013.01); *G06K 9/001* (2013.01)

(58) Field of Classification Search
 CPC ........ G06K 9/0002; G06K 9/001; G06K 9/00; G06K 9/00221; G06K 9/00979; G06F 21/32
 See application file for complete search history.

(56) References Cited

U.S. PATENT DOCUMENTS

| 6,072,895 A | 6/2000 | Bolle et al. |
| 2003/0068072 A1 | 4/2003 | Hamid |
| 2012/0016798 A1 | 1/2012 | Carper |
| 2014/0267659 A1 | 9/2014 | Lyon et al. |
| 2014/0288654 A1 | 9/2014 | Yi et al. |
| 2016/0078274 A1 | 3/2016 | Tuneld et al. |

FOREIGN PATENT DOCUMENTS

EP    1 834 581    11/2012

OTHER PUBLICATIONS

Swedish Search Report from Swedish Application No. 1651675-9, dated Aug. 9. 2017.

*Primary Examiner* — Duy M Dang
(74) *Attorney, Agent, or Firm* — RMCK Law Group PLC (57) ABSTRACT

The present invention generally relates to a method for forming a candidate fingerprint representation of a fingerprint of a finger of a user of an electronic device comprising a capacitive fingerprint sensor for sensing a fingerprint pattern, the method comprising acquiring a sequence of candidate fingerprint images each acquired at different imaging acquisition settings. Further, a fingerprint feature set is extracted from each of the candidate fingerprint images, the fingerprint features of each fingerprint set being extracted according to a first selection criterion. A feature representation set is determined for each of the fingerprint feature sets. A candidate fingerprint representation is formed from a combination of the fingerprint feature representation sets. The invention further relates to a fingerprint sensing system and an electronic device.

17 Claims, 6 Drawing Sheets

METHOD AND DEVICE FOR FORMING A FINGERPRINT REPRESENTATION

CROSS-REFERENCE TO RELATED APPLICATION

The present application is based on and claims the benefit of Swedish patent application Serial No. 1651675-9, filed Dec. 19, 2016, the content of which is hereby incorporated by reference in its entirety.

TECHNICAL FIELD

The present invention generally relates to a method for forming a candidate fingerprint representation. The invention further relates to an electronic device and a fingerprint sensing system.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns the humidity of the finger which is a fundamental problem in particular for capacitive fingerprint sensors. An increase in the humidity level may saturate the fingerprint image which makes verification difficult and sometimes even impossible. Although the humidity issue is an important issue to handle, there may also be other situations which may lead to similar problems for verification. For example, pressure variations on the fingerprint sensor may cause differences in the pixel response of the capacitive fingerprint sensor. This may negatively affect the image quality and the possibility to extract features from the images. In both of the described situations, it may be possible to improve the situation by for example adjusting the sensitivity level of the fingerprint sensor. Such an approach is described in US2014/0267659 in which it is described capturing several images at different sensitivity level and subsequently combining the images. However, this requires substantial computational power, and is also time consuming, thus negatively affecting e.g. user convenience.

Thus, there is a need for improvements with regards fingerprint authentication with fingerprint data combined from several images.

SUMMARY OF THE INVENTION

In view of above-mentioned and other drawbacks of the prior art, it is an object of the present invention to provide an improved method for obtaining fingerprint representations from a combination of fingerprint images.

According to an aspect of the present invention, it is therefore provided a method for forming a candidate fingerprint representation of a fingerprint of a finger of a user of an electronic device comprising a capacitive fingerprint sensor for sensing a fingerprint pattern, the method comprising the steps of: acquiring a sequence of candidate fingerprint images comprising at least a first candidate fingerprint image acquired with a first imaging acquisition setting and a second candidate fingerprint image acquired with a second imaging acquisition setting different from the first imaging acquisition setting; extracting a fingerprint feature set from each of the candidate fingerprint images, whereby a first fingerprint feature set is extracted from the first fingerprint image and a second fingerprint feature set is extracted from the second fingerprint image, the fingerprint features of each fingerprint feature set being extracted from the respective fingerprint image according to a first selection criterion, determining a first feature representation set from the first fingerprint feature set, and a second feature representation set from the second fingerprint feature set; forming the candidate fingerprint representation from a combination of fingerprint feature representation sets comprising at least the first fingerprint feature representation set and the second fingerprint feature representation set.

The present invention is based upon the realization that a feature representation set of a fingerprint obtained from e.g. humid fingers may be improved by using feature information from more than one fingerprint image each captured at a different setting. Such improvement may relate to the amount of features that can be found or ability to perform liveness classification and/or spoof detection. For example, one feature or region of a fingerprint image may be rejected with one setting due to e.g. saturation of the signal but may be selected with another setting. It is further realized that the candidate fingerprint representation is beneficially formed in so called "feature space". Accordingly, the fingerprint features are first extracted from the fingerprint images and the respective fingerprint feature representations are subsequently combined into a candidate fingerprint representation. Thereby, less computational power is required compared to combining images prior to determining the representations. Thus, advantages with the invention include a reduced processing time for acquiring a good quality fingerprint representation, thereby improving e.g. user convenience and reducing the need for computational power while at the same time improving the candidate fingerprint representation from e.g. humid fingers.

The present invention is mainly described with reference to humid fingers, however other situations where different imaging settings may be useful are of course also applicable, for example in case the finger is applied with high pressure variation to the fingerprint sensor during imaging, or for dry fingers, or for so called "difficult fingers".

An imaging acquisition setting may be any setting which alters a quality of the image or at least local regions of the image. Such quality may relate to e.g. contrast, brightness, sharpness, tone, noise, etc.

The step of extracting a fingerprint feature set comprises finding local regions of the respective fingerprint image which is of sufficient image quality, and determining fingerprint features from the local regions. The first selection criterion may thus relate to any one or both of the "finding" step and the "determining" step. The selection criterion may for example relate to that saturated portions of an acquired fingerprint image may be rejected, or based on the pixel response, i.e. not too high response (below a threshold) and not too low (exceeds a threshold), or based on that some fingerprint features are rejected/accepted due to image salience or uniqueness of the feature. Alternatively or additionally, the selection criterion may be based on an evaluation of the local image contrast, e.g. "cornerness" as in the "Harris" or "FAST" corner detector, known as such in the art.

With a capacitive fingerprint sensor, a measure is detected indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint.

In one embodiment, at least one fingerprint feature may be selected from the first fingerprint feature set based on a second selection criterion, and at least one fingerprint feature may be selected from the second fingerprint feature set based on the second selection criterion, wherein the fingerprint feature representation sets are determined from the selected fingerprint features. In other words, the fingerprint features may first be extracted according to the first selection criterion and subsequently a subset of fingerprint features is selected for further processing according to the second criterion. The further processing includes determining fingerprint feature representation sets based on the selected fingerprint features in each set. It should be noted that more than two fingerprint feature sets may be included thereby forming more than two fingerprint feature representation sets.

The first selection criterion and the second selection criterion may be the same criterion. Alternatively, the first selection criterion may be different from the second selection criterion.

In the context of the present application, the "representation" (which may be an enrolment representation or a verification representation) of a fingerprint image may be any information extracted from the fingerprint image, which is useful for assessing the similarity between fingerprint images acquired at different times. For instance, the enrolment/verification representation of the fingerprint image may comprise descriptions (so-called "descriptors") of fingerprint features (such as so-called minutiae) and information about the positional relationship between the fingerprint features and/or the absolute position of the fingerprint features. Example descriptors include "SIFT", "SURF", and "BRIEF" descriptors. Alternatively, the representation of the fingerprint image may be the image itself, or patches of the image, or a compressed version of the image or a patches of the image. For example, the image may be binarized and/or skeletonized. Various ways of extracting such verification representation or enrolment representation from a fingerprint image are well-known to a person of ordinary skill in the relevant art.

Naturally, both selection criteria (e.g. the first or the second criterion) may be based on e.g., image quality of local regions of the fingerprint image, uniqueness of the feature (e.g. unique for the specific user or unique in the respective image), or corner strength measure, etc.

The "image quality" as such may be determined by for example the saturation and/or histogram width of the acquired fingerprint image or a local region of the fingerprint image. Further metrics exists, including for example a measure of the "ease" of acquiring a feature template from the acquired fingerprint image. Additionally, a measure of quality may relate to global or local ridge flow characteristics of the fingerprint pattern in the fingerprint image, such as the gradient direction or gradient magnitude of the ridge flow. For example, if the gradient of the ridge flow in the image shows no correlation, i.e. a random orientation of the gradients indicative of a "random pattern", the quality may be determined to be "poor", whereas if the gradient of the ridge flow indicates relatively strong ridge flow coherence, the quality may be determined to be "good".

According to one embodiment of the invention, if at least one common fingerprint feature is comprised in both the first fingerprint feature set and in the second fingerprint feature set, wherein the method may comprise: forming the candidate fingerprint representation including a representation of the common fingerprint feature for each imaging acquisition setting. Thus, by imaging the same feature more than one time, each time with a different imaging setting, advantageously enables a high dynamic range representation of the fingerprint feature. In this way, the fingerprint feature may be represented at different imaging settings which enable different levels of detail of the fingerprint feature in each of the images. Combined, a fingerprint feature representation with improved quality may be obtained even for humid fingers or e.g. in case a high pressure variation is caused by the applied pressure by the finger on the fingerprint sensor.

Advantageously, a geometrical transformation between the first fingerprint image and the second fingerprint image may be determined based on the common fingerprint feature, whereby the fingerprint feature representation set formed from the first fingerprint feature set may be transformed according to the geometrical transformation before forming the candidate fingerprint representation. It is a common situation that the finger has moved or that the finger has deformed between image captures. Thus, it is preferable to transform the images in order to facilitate finding of matching features for authentication. Such transformation is advantageously performed in feature space, e.g. after having determined the respective representations, compared to transforming the images themselves which requires e.g. warping of the images which is a relatively demanding computational task. E.g. it is the fingerprint features representations that preferably may be geometrically transformed according to the embodiment. In contrast, transforming the feature representations requires less computational power. It is of course possible to transform more than one fingerprint feature set (e.g. 2 sets) according to a geometrical transformation with respect to a third fingerprint feature set. With a geometrical transformation the fingerprint feature sets are advantageously transformed into the same coordinate system.

It may further occur that the first fingerprint feature set comprises at least one fingerprint feature being different from at least one fingerprint feature in the second fingerprint feature set. In such case, the combined fingerprint representation may comprise a larger number of fingerprint features compared to if only a single image was acquired. In other words, features that have not been extractable from one image may instead have been extracted from another image, improving the amount of fingerprint information in the combined fingerprint representation. This is advantageous in particular for relatively small sensors such as the ones integrated in mobile devices. It increases the effective area used which enables higher security.

According to one embodiment, the sequence of candidate fingerprint images may be discarded after the step of extracting fingerprint features for the respective fingerprint image. Thus, since the images themselves are not combined, the images may be discarded after the fingerprint features have been selected (and extracted). This advantageously saves storage area for the system executing the method.

Any one of the imaging acquisition settings may be a gain setting. Alternatively, any one of the imaging acquisition setting may be a shift setting. Further the imaging acquisition setting may be a combination of a gain setting and a shift setting. The imaging settings are set for the fingerprint sensor before capturing an image.

Generally, attempting to overcome the problem with different finger conditions includes using a gain control for adjusting the gain level of an amplifier, in conjunction with the fingerprint sensor, when capturing the fingerprint image. Typically, at least one of the average or peak signal level of a captured fingerprint image are analyzed and used for adjusting the gain to a suitable level. Generally, a comparatively high amplification is desirable for dry fingers, an in comparison low amplification for wet fingers and an in comparison medium amplification is desirable for normal fingers. By tuning the amplification based on e.g. different finger conditions, it will be possible to keep a sufficient contrast between ridges and valleys of the fingerprint, thus allowing a good use of the sensors full dynamic range, enabling a high quality feature extraction (i.e. being a representation of the fingerprint). The gain setting may be pixel gain, e.g. the gain of the amplifier as described above, or a gain setting in the analogue to digital converter used to convert the analogue signals from the amplifier to digital signals for further processing. The pixel gain setting is generally used for amplifying small signals from the pixel e.g. due to reduced capacitive coupling between the finger and sensor, or to compensate for reduced signals for other reasons (e.g. increased coating thickness, etc.). The analogue to digital converter gain setting may generally be used for increasing the contrast between e.g. ridge and valley in the image. The shift setting may be an analogue to digital converter shift setting and may generally be used to reduce large signals, e.g. due to limited dynamic range of the ADC. A shift setting shifts the signal levels from the fingerprint sensor from a relatively high level to a relatively lower level, or from a relatively low level to a relatively higher level by shifting the signal levels as a group. The acquisition settings (gain and shift) may have about 2 to 50 different levels of settings.

There is further provided a method for authenticating a fingerprint of a user of an electronic device comprising a capacitive fingerprint sensor, the method comprising the steps of any of the preceding embodiments, and: performing a fingerprint authentication procedure based on the candidate fingerprint representation. The candidate fingerprint representation is advantageously a verification representation to be matched with an enrolment representation.

According to a second aspect of the invention, there is provided a fingerprint sensing system, comprising: a capacitive fingerprint sensor; and a control unit connected to the fingerprint sensor for: controlling the fingerprint sensor to acquire a sequence of candidate fingerprint images comprising at least a first candidate fingerprint image acquired with a first imaging acquisition setting and a second candidate fingerprint image acquired with a second imaging acquisition setting different from the first imaging acquisition setting; extracting a fingerprint feature set from each of the candidate fingerprint images, whereby a first fingerprint feature set is extracted from the first fingerprint image and a second fingerprint feature set is extracted from the second fingerprint image, the fingerprint features of each fingerprint feature set being extracted from the respective fingerprint image according to a first selection criterion, determining a first fingerprint feature representation set from the first fingerprint feature set, and a second feature representation set from the second fingerprint feature set; forming the candidate fingerprint representation from a combination of fingerprint feature representation sets comprising at least the first fingerprint feature representation set and the second fingerprint feature representation set.

Further embodiments of, and effects obtained through this second aspect of the present invention are largely analogous to those described above for the first aspect of the invention.

According to a third aspect, the fingerprint sensing system preferably forms part of an electronic device further comprising a device controller for providing an authentication request for the finger to the fingerprint sensing system, receiving the authentication signal from the fingerprint sensing system, and performing at least one action if the authentication signal indicates authentication success. Such an action may for example be for unlocking a locked portable device, e.g. in case the portable device is a mobile phone. The at least one action may of course be any type of action suitably used when there is a need to authenticate a finger. Of course, an action may be performed also in the case that the authentication signal indicates authentication rejection (e.g. fingerprint identification or the liveness test was unsuccessful), such as for example providing a message indicative of the rejection.

The electronic device may advantageously be a mobile phone. However, other electronic devices are of course thinkable such as tablets, laptops desktop computers, etc.

The control unit may further be configured to perform a fingerprint authentication procedure based on the candidate fingerprint representation. Thus, the control unit may provide an authentication request for the finger to the fingerprint sensing system, receive an authentication signal from the fingerprint sensing system; and performing at least one action only if the authentication signal indicates authentication success.

Further embodiments of, and effects obtained through this third aspect of the present invention are largely analogous to those described above for the first aspect of the invention.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "processing circuitry" should be understood to include any type of computing device, such as an ASIC, a microprocessor, etc. It should also be understood that the actual implementation of such a processing circuitry may be divided between a plurality of devices/circuits.

According to a further aspect of the present invention, there is provided a computer program product comprising a computer readable medium having stored thereon computer program means for controlling an electronic device, the electronic device comprising a control unit, a capacitive fingerprint sensor, wherein the computer program product comprises: code for controlling the capacitive fingerprint sensor to acquire a sequence of candidate fingerprint images comprising at least a first candidate fingerprint image acquired with a first imaging acquisition setting and a second candidate fingerprint image acquired with a second imaging acquisition setting different from the first imaging acquisition setting; code for extracting a fingerprint feature set from each of the candidate fingerprint images, whereby a first fingerprint feature set is extracted from the first fingerprint image and a second fingerprint feature set is extracted from the second fingerprint image, the fingerprint features of each fingerprint set being extracted from the respective fingerprint image according to a first selection criterion, code for determining a first fingerprint feature representation set for the first fingerprint feature set, and a second feature representation set for the second fingerprint feature set; code for forming the candidate fingerprint representation from a combination of fingerprint feature representation sets comprising at least of the first fingerprint feature representation set and the second fingerprint feature representation set.

Also this aspect of the invention provides similar advantages as discussed above in relation to the previous aspects of the invention.

In summary, the present invention generally relates to a method for forming a candidate fingerprint representation of a fingerprint of a finger of a user of an electronic device comprising a capacitive fingerprint sensor for sensing a fingerprint pattern, the method comprising acquiring a sequence of candidate fingerprint images each acquired at different imaging acquisition settings. Further, a fingerprint feature set is extracted from each of the candidate fingerprint images, the fingerprint features of each fingerprint set being extracted according to a first selection criterion. A feature representation set is determined for each of the fingerprint feature sets. A candidate fingerprint representation is formed from a combination of the fingerprint feature representation sets. The invention further relates to a fingerprint sensing system and an electronic device.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
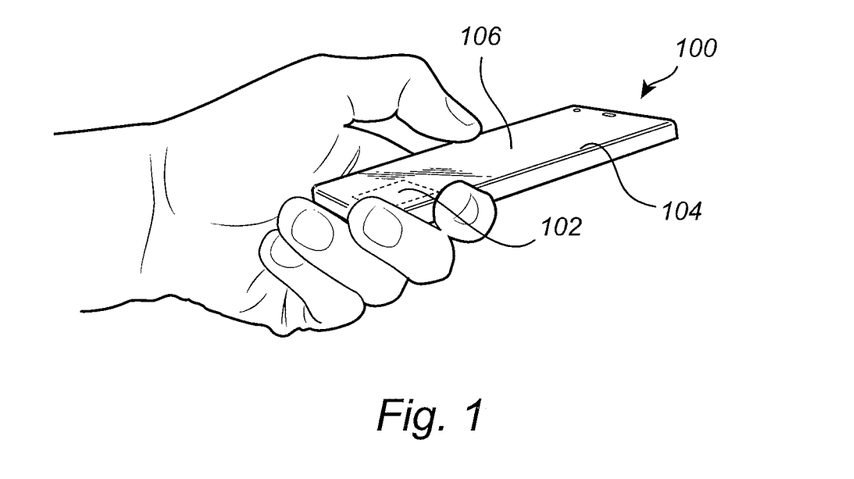
FIG. 1 schematically exemplify an electronic device according to the present invention, in the form of a mobile phone comprising an integrated fingerprint sensor.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100. The electronic device further comprises a device controller (not shown)

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
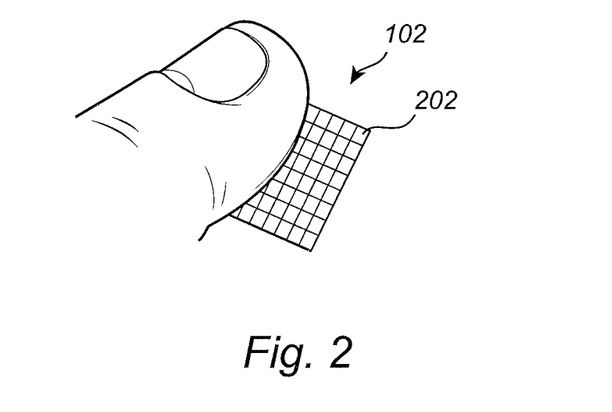
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels or different aspect ratio of pixels as compared to the above example. A single sensing element (also denoted as a pixel) is in FIG. 2 indicated by reference numeral 202.

Figure 3A:
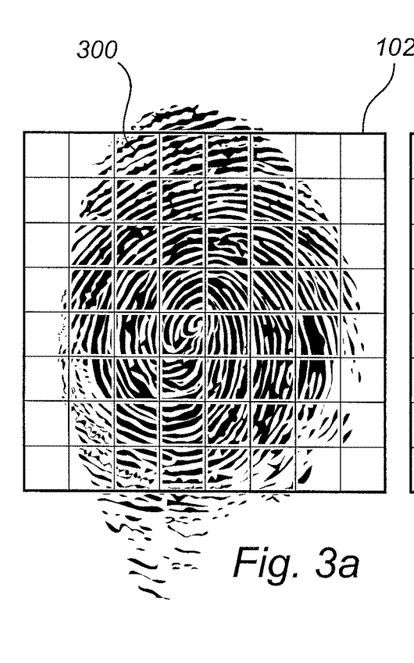
FIG. 3a-3c illustrates three fingerprint images of a fingerprint as detected by a fingerprint sensor.
Figure 3B:
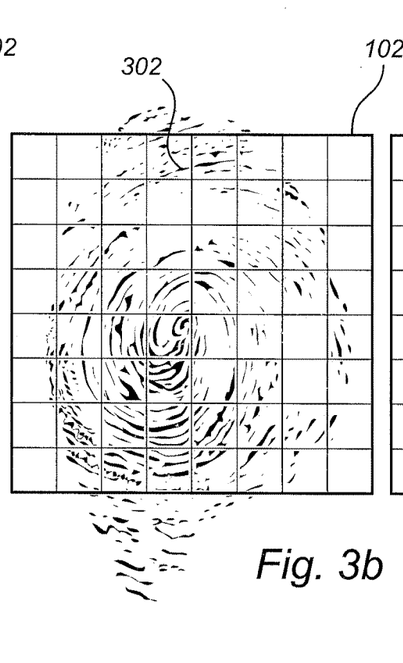
Figure 3C:
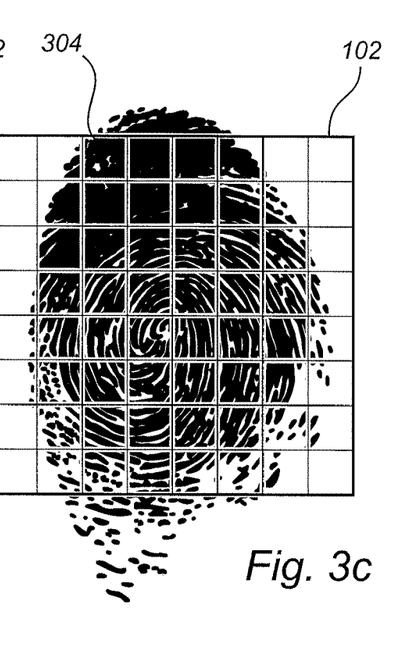

Turning now to FIGS. 3a-3c which show three fingerprint images of a fingerprint as detected by a fingerprint sensor. As briefly discussed above, the output of a fingerprint sensor can be affected by finger conditions and/or due to variations in the manufacturing process. In regards to different finger conditions, the valley-to-ridge ratio may for example vary from person to person. This results in variation from person to person in a ratio of dark-to-light pixels, and thus the contrast, in the captured fingerprint image. Moisture content of skin of the finger can also affect sensor performance. In dry air, such as that found in winter or an air-conditioned environment, a finger tends to have less moisture. In hot, moist air, the finger sweats, resulting in a darker image, relative to that of a dry finger. Conversely, a dry finger produces a brighter image than that of a wet finger. As an example, FIG. 3a illustrates a "normal" finger 300, FIG. 3b illustrates a dry finger 302 and FIG. 3c illustrates a wet finger 304, respectively, captured using a fingerprint sensor. As understood by the skilled addressee when reviewing FIGS. 3a-3c, the level of saturation as well as a fingerprint histogram width will be different for each of the fingerprint images. For example, the saturation level for the dry finger (FIG. 3b) will be in comparison low whereas the saturation level for the wet finger (FIG. 3c) will be in comparison high.

As mentioned above, attempting to overcome the problem with different finger conditions generally includes using gain control technique for adjusting the gain level of an amplifier used, in conjunction with the fingerprint sensor, when capturing the fingerprint image. Typically, at least one of the average or peak signal level of a captured fingerprint image are analyzed and used for adjusting the gain to a suitable level. Generally, an in comparison high amplification is desirable for dry fingers, an in comparison low amplification for wet fingers and an in comparison medium amplification is desirable for normal fingers. Generally, by tuning the amplification based on e.g. different finger conditions, it will be possible to keep a sufficient contrast between ridges and valleys of the fingerprint, thus allowing a good use of the sensors full dynamic range, enabling a high quality feature extraction (i.e. being a representation of the fingerprint). The gain setting may be pixel gain, e.g. the gain of the amplifier as described above, or a gain setting in the analogue to digital converter used to convert the analogue signals from the amplifier to digital signals for further processing. The pixel gain setting is generally used for amplifying small signals from the pixel e.g. due to reduced capacitive coupling between the finger and sensor, or to compensate for reduced signals for other reasons (e.g. increased coating thickness, etc.). The analogue to digital converter gain setting may generally be used for increasing the contrast between e.g. ridge and valley in the image. Another setting is a shift setting which may be set in an analogue to digital converter. The shift may generally be used to reduce large signals, e.g. due to limited dynamic range of the ADC. Generally, a shift setting is configured to cause a shift the signal levels from the pixels form a first overall signal level to a second overall signal level, in such a way that a fingerprint image histogram is shifted for example to be centered around a specific signal level.

Figure 4:
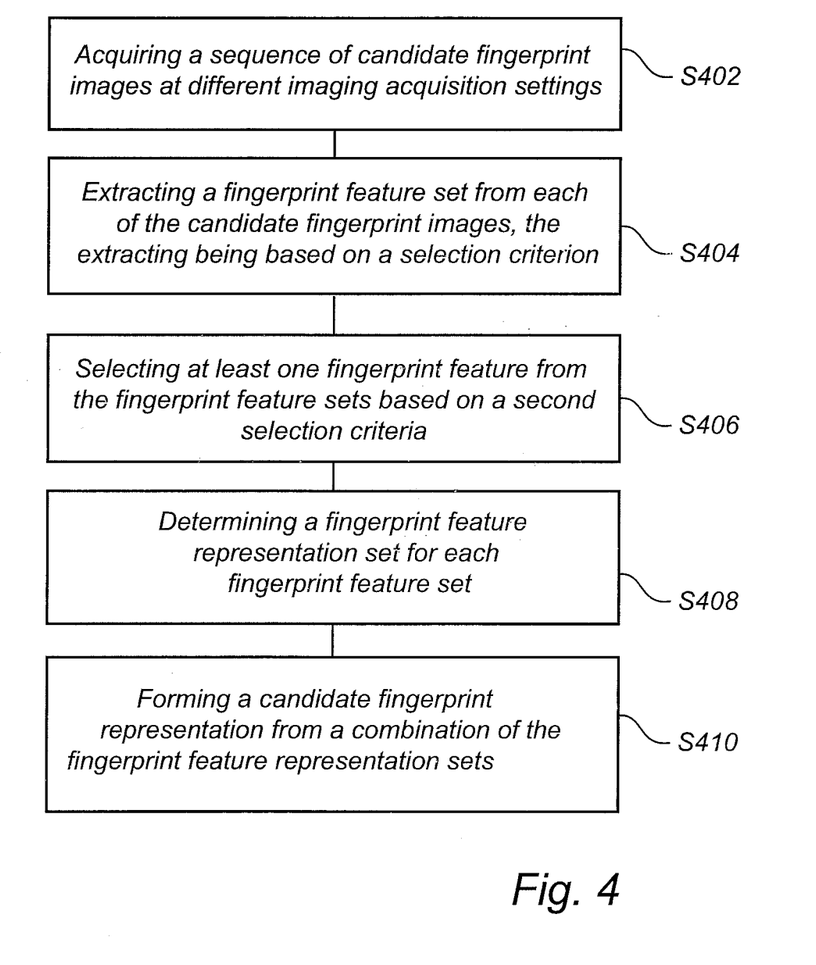
FIG. 4 is a flow-chart of method steps according to an embodiment of the invention.

FIG. 4 is a flow-chart of method steps according to embodiments of the invention. In a first step S402, a sequence of candidate fingerprint images is acquired comprising at least a first candidate fingerprint image acquired with a first imaging acquisition setting and a second candidate fingerprint image acquired with a second imaging acquisition setting different from the first imaging acquisition setting. Next S404, a fingerprint feature set is extracted from each of the candidate fingerprint images, whereby a first fingerprint feature set is extracted from the first fingerprint image and a second fingerprint feature set is extracted from the second fingerprint image, the fingerprint features of each fingerprint feature set being extracted from the images according to a first selection criterion. A first feature representation set is determined S408 for the first fingerprint feature set and a second feature representation set is determined the second fingerprint feature set. A candidate fingerprint representation is subsequently formed S410 from a combination of at least the first feature representation set and the second feature representation set. Of course further fingerprint feature representation sets from further fingerprint images of the sequence may be included. In one embodiment, there is included an optional step of selecting S406 at least one fingerprint feature from the first fingerprint feature set based on a second selection criterion, and at least one feature from the second fingerprint feature set based on the second selection criterion.

Figure 5A:
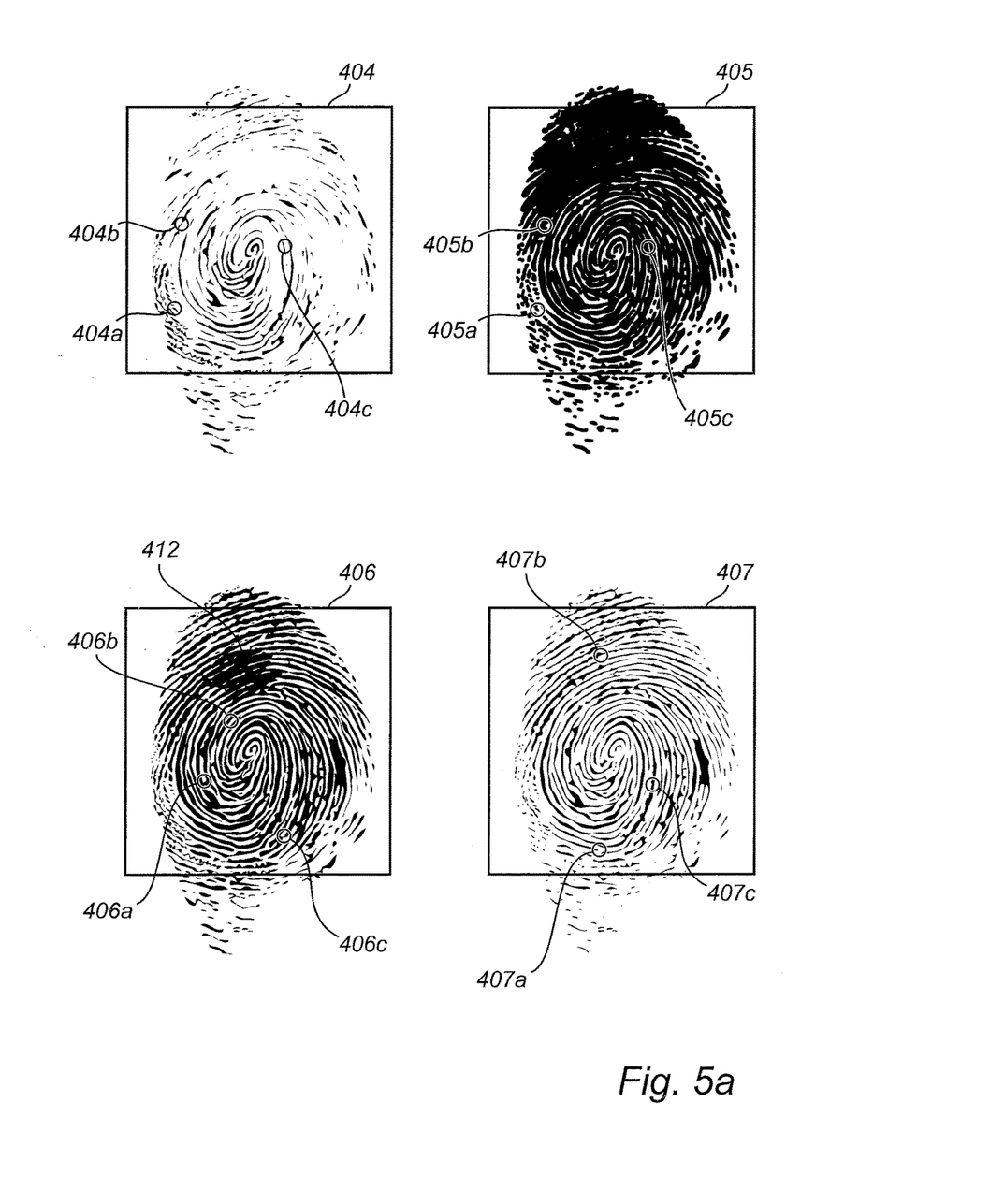
FIGS. 5a-5c conceptually illustrates the process forming a candidate fingerprint representation from a sequence of fingerprint images.
Figure 5B:
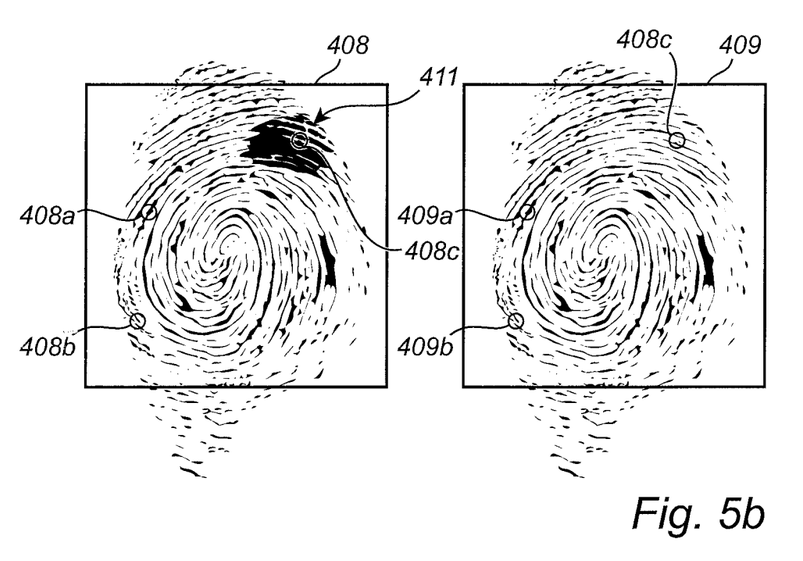
Figure 5C:
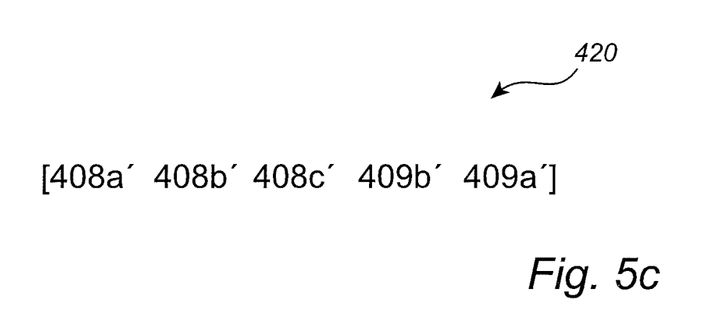

FIG. 5a-c conceptually illustrates the process of forming a candidate fingerprint representation from a sequence of fingerprint images. The images 404-407 may include complete fingerprints (as in the depicted case) or partial fingerprints. In the beginning of the process, a user applies a finger on the sensing area of a capacitive fingerprint sensor 102. For exemplary purposes, the finger is here assumed to be of the type "high-humidity" finger. The fingerprint sensor 102 captures (S402) a sequence of fingerprint images 404-407 of the fingerprint of the finger 402. Each of the images 404-407 is acquired with a different imaging acquisition setting, for example, image 404 may have been acquired with a first gain setting and the image 405 may have been acquired with a second gain setting, the image 406 may have been acquired with a first shift setting, and the image 407 may have been acquired with a second shift setting.

A feature extraction algorithm running e.g. a key point extraction algorithm extracts (S404) a fingerprint feature set from each of the images. The first fingerprint feature set comprises the features 404a-c, the second fingerprint feature set comprises the features 405a-c, the third fingerprint feature set comprises the features 406a-c, and the fourth fingerprint feature set comprises the features 407a-c. It should be noted again that each of the fingerprint features sets have been extracted from fingerprint images acquired with different imaging settings. The extraction of fingerprint feature sets is performed according to a first selection criterion. The selection criterion may be based on e.g. the key point extraction in which key points are chosen based on corner strength which enables rejection of low contrast regions in the images 404-407. For example, as conceptually illustrated in FIG. 5b, a feature 408c in image 408 in the sequence of images may have been present in a sweaty patch of the finger resulting in a low contrast region 411 (or a saturated region) in this particular image acquired with a further gain setting. By applying the first selection criterion, this region 411 of the image is rejected and therefore also the feature 408c in image 408. Effectively, since region 411 is of low quality (e.g. saturated or low contrast) the feature 408c would in some cases not even be extractable.

Turning back to FIG. 5a, and the fingerprint images 406 and 407 conceptually illustrating images with different shift setting. A shift setting generally reduces high signals in the image. In image 406 a dark patch 412 represents a region of pixels which provided high outputs with a first shift setting. The effect being that the region 412, and any fingerprint features present in the region was rejected according to the first selection criterion, e.g. during key point extraction by considering corner strength. Image 407 was acquired with a different shift setting which had the effect that feature 407b present in the region 412 is extractable from image 407. As is conceptually illustrated, the shift setting used for the image 407 reduced the signal levels from the region 412.

During the extraction of features, only pixels with sufficiently high response (e.g. better than a threshold value but below saturation) may be chosen for finding features in the image as a selection criterion. Other possible selection criteria may be image quality of the respective fingerprint image, uniqueness of the feature (e.g. unique for the specific user or unique in the respective image) or image salience. Also combinations of selection criterion may be applied.

Optionally, a further step of selecting fingerprint features from the extracted fingerprint feature sets is included. The selection may be based on a second criterion, thus from among the extracted fingerprint features 404a-b, 405a-c, 406a-c, 407a-c, only a portion of fingerprint features may be selected for further processing. This second selection criterion may be the same criterion as the first (above) selection criterion or it may be a different criterion. For example, the first criterion may be based on corner strength as described above, and the second criterion may be based on the uniqueness of the fingerprint features, or based on that features are found in the same location in the images, or based on global or local ridge flow characteristics (e.g.

correlation of the ridge flow gradients in the image), etc. Alternatively, the second criterion also relate to the corner strength.

Advantageously, according to one possible embodiment of the invention, the sequence of candidate fingerprint images can be discarded as soon as the fingerprint features have been extracted from the respective fingerprint image. With this embodiment, storage space (see e.g. storage 608 in FIG. 6) may be advantageously saved for other purposes or the storage space may be reduced which simplifies the system and/or reduces the cost for the system.

Turning now again to FIG. 5*b*, illustrating the images 408 and 409, from which features 408*a-b* are extracted/selected from image 408 according to the first and/second selection criterion, and features 409*a-b* and 408*c* are extracted/selected from image 409 according to the first and/or selection criterion. Of course further images (e.g. images 404-407) may be included with a similar reasoning, but are excluded here for clarity. As described above the feature 408*c* was rejected in image 408 according to the first selection criterion, however, the same feature 408*c* is found in image 409 acquired with a different imaging acquisition setting. Thus, although the feature information of the feature 408*c* was not extractable from image 408 due to the saturated region 411 of the image, it was extractable from image 409. Combining the feature sets will thus result in a combined feature set which comprising an improved representation of the fingerprint compared to using only a single image.

Next, with reference to the conceptual drawing of a candidate fingerprint representation 420, representations (conceptually denoted 408*a*', 408*b*', 408*c*', 409*a*', 409*b*') of the features (408*a*, 408*b*, 408*c*, 409*a*, 409*b*) are determined (S408). The formation of such a representation is described above (see summary) and is generally known as such to the skilled person. Briefly, a fingerprint representation may comprise a descriptor which comprises a location (e.g. coordinates (x, y)) of the feature in the image, and a description of the feature itself, e.g. a description of the local region in the vicinity of the location (x, y). The location (x, y) may be extracted from a key point extraction procedure. The representations are combined (S410) to form a candidate fingerprint representation. The candidate fingerprint representation may comprise a vector 420 with each of the 408*a*', 408*b*', 408*c*', 409*a*', 409*b*' for the selected fingerprint features 408*a-c*, 409*a-b*, and optionally with a label (not shown) indicative of the respective imaging acquisition setting.

In the exemplary case illustrated in FIG. 5*a*, the features 404*a-c* and 405*a-c* may be the same features providing for improved feature representation for features that may otherwise be difficult to extract due to e.g. humidity of the finger, or portions of the finger. Note however, that it is also possible that different features are extracted from some images in the sequence of images. For example as is illustrated in images 406 and 407 of FIG. 5*b* where for example feature 406*b* is not found in image 407. In other words, all features may not be extracted from all the images. In that way, a larger number of features may be represented in the candidate fingerprint representation compared to when each of the features are extracted from all the images.

Selecting the image acquisition settings for each of the images in the sequence of images may be done by a predetermined scheme of settings (e.g. selected from a look-up table(s) of imaging acquisition settings) or by a sequence which is based on analysis of a previously acquired image.

In some situations, it may be required to geometrically transform fingerprint images in order to more easily perform verification. Geometrically transforming an image is computationally costly. Embodiments of the invention provide a more computationally efficient way of achieving the same result, but instead the transformation is performed on the representations of the fingerprint feature. For example, considering the case that a common fingerprint feature 404*c*, 405*c* was present in both images 404 and 405, was displaced in image 405 compared to in image 404. By matching the common feature 404*c*, 405*c* in both images 404 and 405, the geometrical transformation (not shown) may be found from the images. However, the actual transformation to be used for the fingerprint representation is performed on the fingerprint feature representations themselves. The transformation in "feature space" is possible since the representation comprises the feature representation including a location (e.g. coordinates (x, y)) in the respective image. The feature representation is typically comprised of a binary string as known in the art but also including the mentioned location in the image. In this exemplary case, the feature representation 405*c*' may be geometrically transformed in order to match the location of the feature representation 404*c*'. This geometrical transformation may be performed before forming the candidate fingerprint representation.

Figure 6:
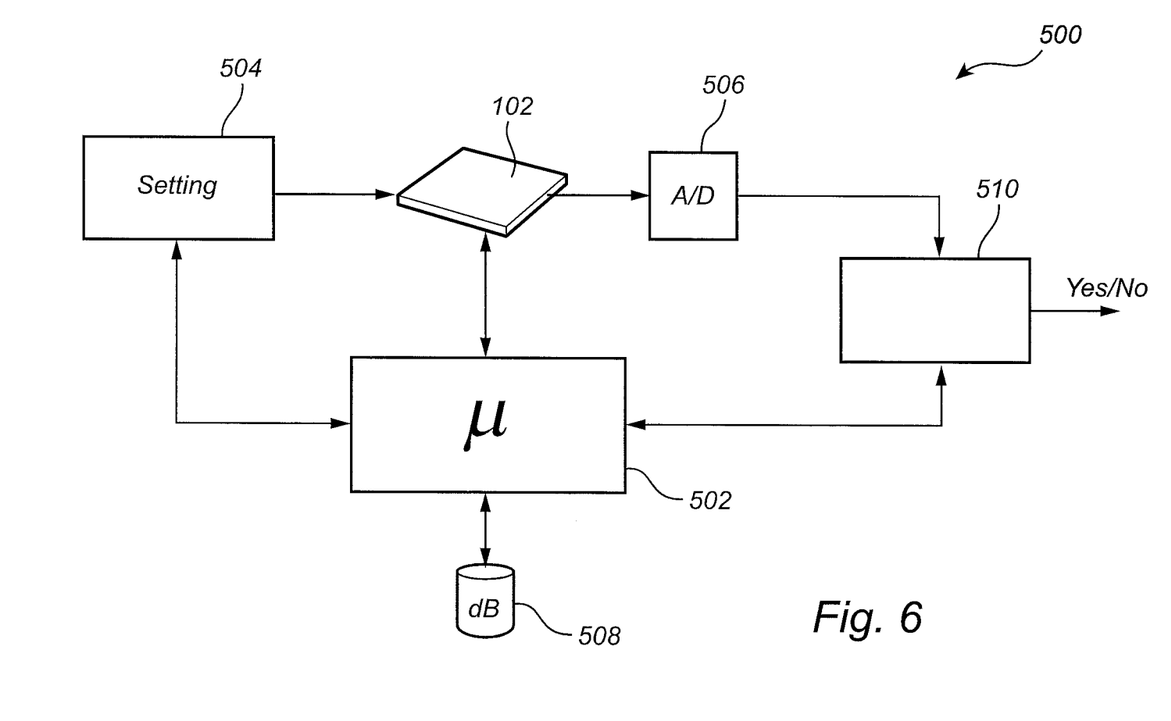
FIG. 6 schematically illustrates a fingerprint sensor system.

Turning now to FIG. 6 schematically illustrating a fingerprint sensing system 500 comprising the fingerprint sensor 102 and a processing circuitry, such as a control unit 502 for controlling the fingerprint sensor 102. The fingerprint sensor system 500 further comprises an imaging acquisition setting module 504 for selecting an imaging acquisition setting, an A/D conversion module 506 and a memory, such as a database 508. The imaging acquisition setting module 604, the A/D conversion module 506 and the database 508 are all communicatively connected with the control unit 502. In addition, the fingerprint sensor system 500 comprises a comparison and verification module 510, adapted for authenticating a candidate fingerprint against an enrolled fingerprint. A plurality of amplifying elements may be used/combined. In such a case, a pre-stored sensor imaging acquisition setting as discussed in relation to the invention may comprise settings for each of the plurality of amplifying elements.

The imaging acquisition setting module 504 selects the image acquisition settings for each of the images in the sequence of images according to a predetermined scheme of settings (e.g. selected from a look-up table(s) of imaging acquisition settings) or by a sequence which is based on analysis of a previously acquired image. The imaging acquisition module 504 may be part of the control unit 502. In addition, the comparison and verification module 510 may be part of the control unit 502.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for forming a candidate fingerprint representation of a fingerprint of a user of an electronic device comprising a capacitive fingerprint sensor for sensing a fingerprint pattern, the method comprising the steps of:
   acquiring a sequence of candidate fingerprint images comprising at least a first candidate fingerprint image acquired with a first imaging acquisition setting and a second candidate fingerprint image acquired with a second imaging acquisition setting different from the first imaging acquisition setting;
   extracting a fingerprint feature set from each of the candidate fingerprint images, whereby a first fingerprint feature set is extracted from the first candidate fingerprint image and a second fingerprint feature set is extracted from the second candidate fingerprint image, the fingerprint features of each fingerprint feature set being extracted from the respective candidate fingerprint image according to a first selection criterion,
   determining a first fingerprint feature representation set from said first fingerprint feature set, and a second fingerprint feature representation set from said second fingerprint feature set;
   forming a candidate fingerprint representation from a combination of fingerprint feature representation sets comprising at least said first fingerprint feature representation set and said second fingerprint feature representation set.

2. The method according to claim 1, further comprising:
   selecting at least one fingerprint feature from said first fingerprint feature set based on a second selection criterion, and at least one fingerprint feature from said second fingerprint feature set based on said second selection criterion, wherein said fingerprint feature representation sets are determined from said selected fingerprint features.

3. The method according to claim 2, wherein the second selection criterion is the same as the first selection criterion.

4. The method according to claim 2, wherein the second selection criterion is different from the first selection criterion.

5. The method according to claim 1, wherein at least one common fingerprint feature is comprised in both the first fingerprint feature set and in the second fingerprint feature set, wherein said method comprises:
   forming said candidate fingerprint representation including a representation of said common fingerprint feature for each imaging acquisition setting.

6. The method according to claim 5, comprising:
   determining a geometrical transformation between the first fingerprint image and the second fingerprint image based on the common fingerprint feature, and
   transforming the fingerprint feature representation set formed from said first fingerprint feature set according to the geometrical transformation before forming said candidate fingerprint representation.

7. The method according to claim 1, wherein the first fingerprint feature set comprises at least one fingerprint feature being different from at least one fingerprint feature in said second fingerprint feature set.

8. The method according to claim 1, further comprising:
   discarding said sequence of candidate fingerprint images after said step of extracting fingerprint features for the respective fingerprint image.

9. The method according to claim 1 wherein any one of said imaging acquisition setting is a gain setting for the fingerprint sensor.

10. The method according to claim 1, wherein any one of said imaging acquisition setting is a shift setting for the fingerprint sensor.

11. The method according to claim 1, wherein any one of said imaging acquisition setting is a combination of a gain setting and a shift setting for the fingerprint sensor.

12. A method for authenticating a fingerprint of finger of a user of an electronic device comprising a capacitive fingerprint sensor, said method comprising the steps of claim 1, and:
   performing a fingerprint authentication procedure based on said candidate fingerprint representation.

13. A fingerprint sensing system, comprising:
   a capacitive fingerprint sensor; and
   a processor connected to said fingerprint sensor for:

controlling the fingerprint sensor to acquire a sequence of candidate fingerprint images comprising at least a first candidate fingerprint image acquired with a first imaging acquisition setting and a second candidate fingerprint image acquired with a second imaging acquisition setting different from the first imaging acquisition setting;

extracting a fingerprint feature set from each of the candidate fingerprint images, whereby a first fingerprint feature set is extracted from the first candidate fingerprint image and a second fingerprint feature set is extracted from the second candidate fingerprint image, the fingerprint features of each fingerprint feature set being extracted from the respective candidate fingerprint image according to a first selection criterion, determining a first fingerprint feature representation set from said first fingerprint feature set, and a second feature representation set from said second fingerprint feature set;

forming a candidate fingerprint representation from a combination of fingerprint feature representation sets comprising at least said first fingerprint feature representation set and said second fingerprint feature representation set.

14. The fingerprint sensing system according to claim 13, wherein said capacitive fingerprint sensor comprises a two-dimensional array of sensing elements configured to obtain a measure of the capacitive coupling between the finger and each sensing element.

15. An electronic device, comprising:
a fingerprint sensing system according to claim 13, and a device controller for:
providing an authentication request for said finger to the fingerprint sensing system;
receiving said authentication signal from the fingerprint sensing system; and
performing at least one action if said authentication signal indicates authentication success.

16. The electronic device according to claim 15, wherein the electronic device is a mobile phone.

17. Computer program product comprising a non-transitory computer readable medium having stored thereon computer program means for controlling an electronic device, the electronic device comprising a control unit, a capacitive fingerprint sensor, wherein the computer program product comprises:

code for controlling said capacitive fingerprint sensor to acquire a sequence of candidate fingerprint images comprising at least a first candidate fingerprint image acquired with a first imaging acquisition setting and a second candidate fingerprint image acquired with a second imaging acquisition setting different from the first imaging acquisition setting;

code for extracting a fingerprint feature set from each of the candidate fingerprint images, whereby a first fingerprint feature set is extracted from the first candidate fingerprint image and a second fingerprint feature set is extracted from the second candidate fingerprint image, said fingerprint features of each fingerprint feature set being extracted from the respective candidate fingerprint image according to a first selection criterion, code for determining a first fingerprint feature representation set from said first fingerprint feature set, and a second feature representation set from said second fingerprint feature set;

code for forming a candidate fingerprint representation from a combination of fingerprint feature representation sets comprising at least said first fingerprint feature representation set and said second fingerprint feature representation set.

* * * * *